Aug. 23, 1949.  C. H. MATSON  2,479,952
ADJUSTABLE FISHING REEL SEAT
Filed April 26, 1946  2 Sheets-Sheet 1
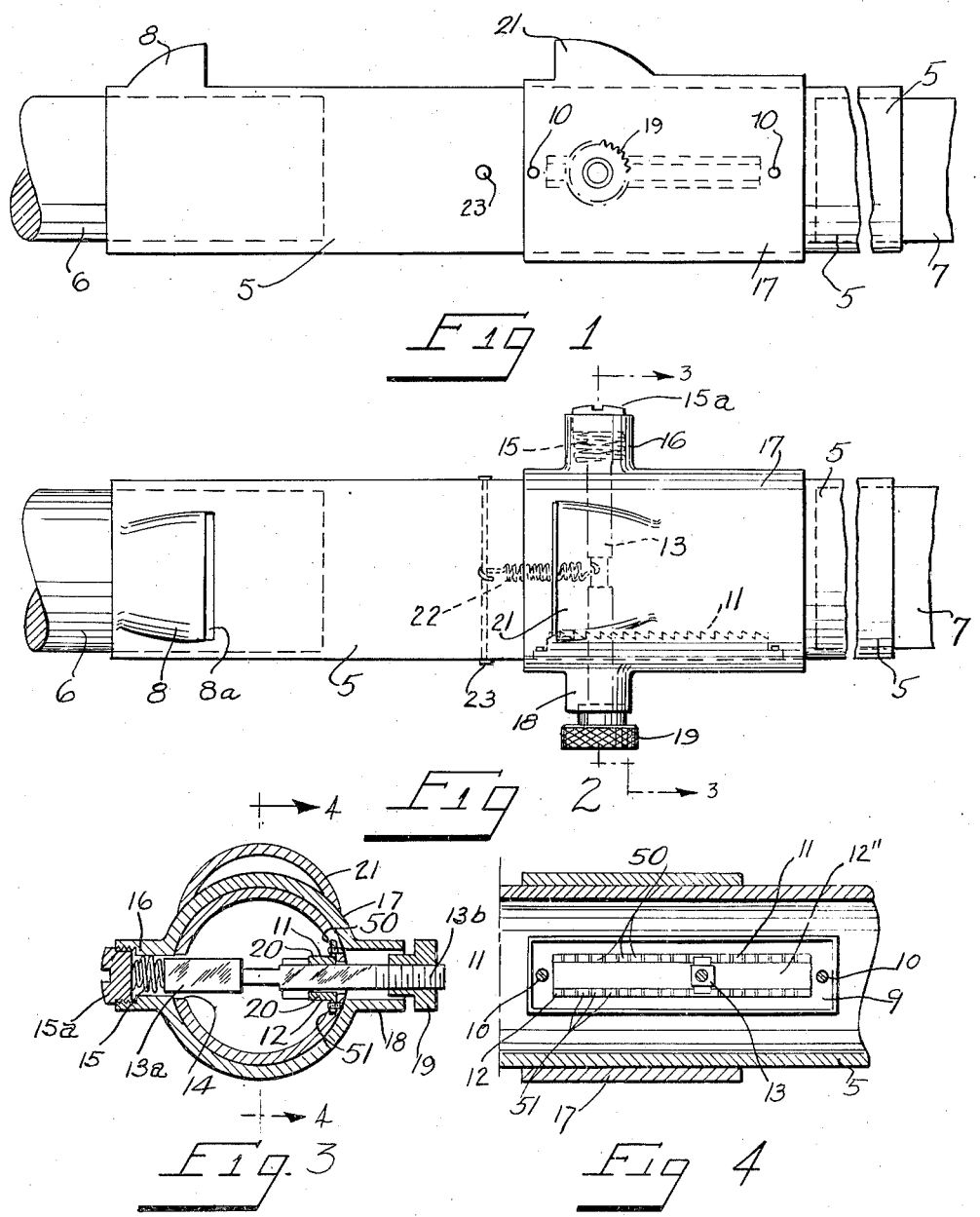
INVENTOR.
Charles H. Matson
By Smith, Russell & Squire
Attorneys Aug. 23, 1949.　　　　　C. H. MATSON　　　　　2,479,952
ADJUSTABLE FISHING REEL SEAT
Filed April 26, 1946　　　　　　　　　　　　2 Sheets-Sheet 2
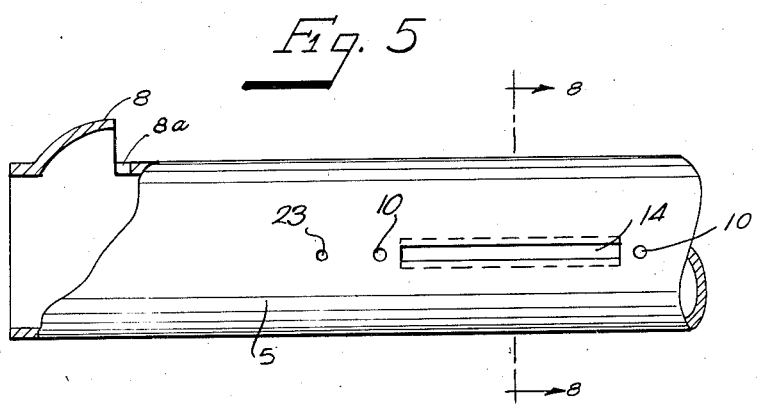
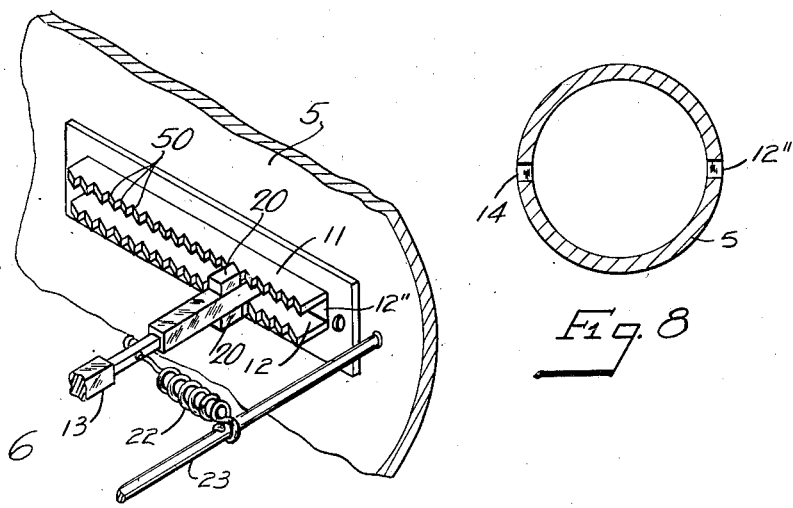
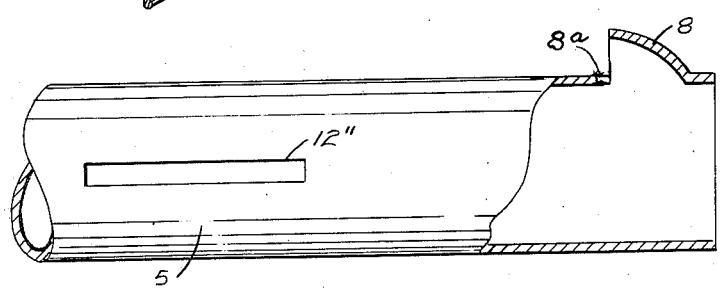
INVENTOR.
Charles H. Matson
By Smith, Russell & Squire
Attorneys Patented Aug. 23, 1949

2,479,952

UNITED STATES PATENT OFFICE 2,479,952

ADJUSTABLE FISHING REEL SEAT

Charles H. Matson, New York, N. Y.

Application April 26, 1946, Serial No. 665,225

4 Claims. (Cl. 43—22)

This invention relates to an improved device for adjustably mounting a fishing reel on a fishing pole, and one of the objects of the invention is to provide means for holding the reel in clamped position with the aid of a spring which exerts a constant pressure to maintain the reel in clamped position and independent means for manually releasing the reel for complete separation from the fishing pole.

Another object of the invention is to provide a ratchet rack bar and a manually releasable spring-pressed pawl arranged to engage the rack bar to lock a reel jaw in position and adapted to release the reel jaw when manually operated so that the fishing reel may be completely withdrawn from the fishing pole.

A further object of the invention is the construction of a manually released reel lock which will be simple to manufacture and to operate and which will positively hold the fishing reel in clamped position.

With the above and other objects in view the invention comprises certain new and useful constructions, combinations and arrangements of parts, clearly described in the specification and fully illustrated in the drawings, in which:

Fig. 1 is a side view of the combined device,

Fig. 2 is a top plan view thereof,

Fig. 3 is a transverse sectional view, taken on line 3—3 of Fig. 2,

Fig. 4 is a longitudinal sectional view, taken on line 4—4 of Fig. 3,

Fig. 5 is a side elevation, partly in section, of a housing sleeve,

Fig. 6 is an enlarged perspective view, showing certain details of the invention, Fig. 7 is a side elevation of the housing sleeve, showing the opposite side of the same to that shown in Fig. 5, and Fig. 8 is a transverse sectional view, taken on line 8—8 of Fig. 5.

Referring to the accompanying drawings, which illustrate the practical embodiment of the invention, there is shown a housing sleeve 5 which is mounted on the opposing ends of a pair of fishing pole sections indicated at 6 and 7, in any approved manner, so as to provide a relatively long gap between these opposing ends.

The housing sleeve is formed with a stationary reel jaw 8 which is open on one side thereof to receive the usual base arm of the fishing reel, not shown. It will be seen that a portion of the sleeve 5 is cut away as indicated at 8A in order to facilitate the entry of a fishing reel seat under the jaw 8. One side of this housing sleeve is provided with a plate 9 which is attached in place by fasteners 10 and the plate is provided with parallel ratchet rack bars 11 and 12 having teeth 50 and teeth 51, respectively. The bars are located on the sides of a longitudinal slot 12", equal in length to that of the bars. A square plunger rod 13 is slidable in the slot 12". The plunger bar has a total length exceeding the diameter of the housing sleeve 5, and one end of the plunger rod projects through the slot 14 which is parallel to and opposite the slot 12". One end 13a of the bar 13 engages a coil spring 15 which is housed in a boss 16 formed integrally or rigidly with the wall of a tubular sleeve 17. The other and longer operating end 13b of the plunger rod projects through a boss 18 formed on the sleeve 17 and is equipped with a nut 19 which is threaded thereon.

The plunger bar or rod 13 is provided with clutch or ratchet teeth 20 on opposite sides thereof and designed to engage the teeth of the ratchet rack bars 11 and 12. The sleeve 17 is slidably mounted on the housing sleeve 5 and is formed with a jaw 21 generally similar to the jaw 8 of the housing reel, which is adapted to receive the other base arm of the fishing reel, not shown.

The plunger rod 13 is thus carried by the sliding sleeve 17 and is acted on by a coil spring 22 one end of which is connected to the plunger rod 13 and the other end of which is connected to a cross shaft 23 which is secured directly to the housing sleeve 5.

The coil spring 15 is adjusted by means of a screw 15a by removing which a new spring may be placed in position against the plunger rod 13.

The ratchet teeth of the rack bars slope in the direction of the fixed jaw 8 of the housing sleeve 5 and the sliding sleeve 17 may be adjusted on the housing sleeve 5 by manually pressing the plunger 13 against the spring 15 so that the clutch teeth 20 will be disengaged from the teeth of the rack bars 11 and 12 whereupon the sliding sleeve 17 may be allowed to move toward the fixed jaw 8 or pulled against the tension of the spring 22 in the opposite direction.

The ends of the base arm of the fishing reel are inserted in the fixed jaw and in the movable jaw, and the sliding sleeve 17 is shifted toward the fixed jaw 8 so that the movable jaw 21 may be moved toward the fixed jaw 8, thereby forcing the base holding arms of the fishing reel into the two jaws 8 and 21.

To release the fishing reel the plunger 13 is pressed inwardly and the sliding sleeve 17 is shifted on the housing sleeve 5 away from the stationary jaw 8, thus permitting the fishing reel to be entirely disengaged from the fishing pole.

It is understood that various minor modifications may be made herein without departing from the spirit of the invention or the scope of the appended claims.

I claim:

1. A fishing reel connector for fishing poles comprising a housing sleeve attachable to confronting fishing pole sections and having a pair of oppositely disposed slots, a ratchet-toothed rack disposed in the housing sleeve and having a slot longitudinally disposed therein, a stationary reel-holding jaw on the housing sleeve, a sliding sleeve on the housing sleeve and provided with a reel-holding jaw, and a spring-pressed plunger slidably mounted in all of the slots and the sliding sleeve and having teeth to engage the rack.

2. A fishing reel connector for fishing poles comprising a housing sleeve formed with opposing parallel slots and adapted to receive pole sections in its opposite ends and providing a gap between the pole sections, a pair of parallel ratchet racks mounted in the housing sleeve in said gap adjacent one of the slots, a sleeve having a companion reel holding jaw slidably mounted on the housing sleeve, a plunger bar slidably mounted in the slots and the slidably mounted sleeve and provided with teeth to engage the racks, a spring connecting the plunger bar and the housing sleeve to maintain a pull on the sliding sleeve, and a spring for normally holding the plunger bar teeth in engagement with the racks.

3. An adjustable fishing reel seat comprising a fixed sleeve having a reel engaging portion, a movable sleeve slidably mounted thereover and carrying a reel engaging portion, means for normally forcing the movable sleeve engaging portion toward the fixed sleeve engaging portion, means for preventing retrograde movement of the movable sleeve and for releasing the movable sleeve from the fixed sleeve comprising, a rack carried by the fixed sleeve, a pawl carried by the movable sleeve, and a plunger slidably mounted in the movable sleeve for actuating the pawl.

4. An adjustable fishing reel seat comprising a fixed sleeve having a reel engaging portion and a pair of opposing longitudinal slots cut therein, a movable sleeve slidably mounted thereon and carrying a reel engaging portion, a spring suitably mounted for normally forcing the movable reel engaging portion toward the fixed reel engaging portions, a rack mounted upon the inner side of the fixed sleeve parallel with one of the slots, and a spring-pressed pin mounted transversely in the movable sleeve and longitudinal slots and carrying a pawl for normal engagement with the rack and having an actuating button upon its outer end whereby the pawl may be manually disengaged from the rack.

CHARLES H. MATSON.

REFERENCES CITED

The following references are of record in the file of this patent:

UNITED STATES PATENTS

| Number | Name | Date |
|---|---|---|
| 790,419 | Bartlett | May 23, 1905 |
| 1,902,749 | Baird et al. | Mar. 21, 1933 |

FOREIGN PATENTS

| Number | Country | Date |
|---|---|---|
| 1,234 | Great Britain | Jan. 11, 1884 |